United States Patent
Mohindra

(10) Patent No.: US 12,395,380 B1
(45) Date of Patent: Aug. 19, 2025

(54) SYSTEM AND METHOD OF PERFORMING CHANNEL SOUNDING FOR MODELING ULTRAWIDEBAND RADIO FREQUENCY CHANNELS

(71) Applicant: Keysight Technologies, Inc., Santa Rosa, CA (US)

(72) Inventor: Rishi Mohindra, Santa Clara', CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/424,362

(22) Filed: Jan. 26, 2024

(51) Int. Cl.
| | | |
|---|---|---|
| H04L 25/02 | (2006.01) | |
| H04L 27/01 | (2006.01) | |
| H04L 27/148 | (2006.01) | |
| H04L 27/152 | (2006.01) | |

(52) U.S. Cl.
CPC ...... *H04L 25/0224* (2013.01); *H04L 25/0212* (2013.01); *H04L 25/022* (2013.01); *H04L 27/01* (2013.01); *H04L 27/148* (2013.01); *H04L 27/152* (2013.01)

(58) Field of Classification Search
CPC .......... H04L 25/0224; H04L 25/0212; H04L 25/022; H04L 27/01; H04L 27/148; H04L 27/152
See application file for complete search history.

(56) References Cited

U.S. PATENT DOCUMENTS

| | | | |
|---|---|---|---|
| 8,743,976 B2 * | 6/2014 | Smith | H04L 25/0212 375/259 |
| 10,708,086 B2 | 7/2020 | Gul et al. | |
| 2004/0066312 A1 * | 4/2004 | Hoctor | H04L 5/06 370/344 |
| 2004/0185787 A1 * | 9/2004 | Molisch | H04B 1/71637 455/67.11 |

(Continued)

OTHER PUBLICATIONS

Ted C.-K. Liu et al., "A high-resolution, multi-template deconvolution algorithm for time-domain UWB channel characterization," CAN. J. ELECT. COMPUT. ENG., vol. 32, No. 4, Fall 2007, pp. 207-213.

(Continued)

*Primary Examiner* — Freshteh N Aghdam

(57) ABSTRACT

A system and method perform channel sounding for modeling ultrawideband RF channels. The method includes modulating an ultrawideband RF signal with a sounding waveform including streaming data with conforming sounding symbols including no gaps and having zero signal phase at the boundaries; receiving, digitizing and performing digital down conversion of the ultrawideband RF signal to obtain a baseband digitized signal that includes the streaming data; converting the streaming data into packets based on a notional start time, where each packet is formed of at least two consecutive conforming sounding symbols; performing coherent averaging of the packets; determining an equalized CFR and an equalized CIR for each coherently averaged packet; modeling an ultrawideband RF channel or sub-band (Continued)

of the ultrawideband RF channel using the equalized CIR and/or the equalized CFR, and converting the modeled ultrawideband RF channel or sub-band into a sparse tap-delay channel model for each coherently averaged packet.

20 Claims, 9 Drawing Sheets

(56) References Cited

U.S. PATENT DOCUMENTS

| | | | |
|---|---|---|---|
| 2009/0054075 A1* | 2/2009 | Boejer | H04B 7/18532 342/357.49 |
| 2012/0106380 A1* | 5/2012 | Vaidyanathan | G01S 5/14 370/252 |
| 2014/0327644 A1 | 11/2014 | Mohindra | |
| 2014/0341411 A1 | 11/2014 | Mohindra et al. | |
| 2022/0239530 A1 | 7/2022 | Wagner et al. | |

OTHER PUBLICATIONS

Rudolf Zetik et al., "Real-Time MIMO Channel Sounder for Emulation of Distributed Ultrawideband Systems," Hindawi Publishing Corporation International Journal of Antennas and Propagation, vol. 2014, Sep. 15, 2014, Article ID 317683, pp. 1-17.

* cited by examiner

SYSTEM AND METHOD OF PERFORMING CHANNEL SOUNDING FOR MODELING ULTRAWIDEBAND RADIO FREQUENCY CHANNELS

BACKGROUND

High Speed ultrawideband (UWB) channel sounding requires a combination of extreme path loss on the order of about 120 dB where sounding signal is buried deep below noise, UWB channel sounding on the order of 10 GHz or more bandwidth with no limit to carrier frequency, ability to perform high-speed measurements of fast changing channel for resolving Doppler spread in the order of hundreds of Hz, and solving the problem of timing drift without having to use synchronized Rubidium clocks as references at the Transmit and Receive stations.

Generally, conventional channel sounding solutions include vector network analyzer (VNA) based measurements, arbitrary waveform generator (AWG) based measurements, and vector signal analyzer (VSA) based measurements using Golay code sequences. The VNA based measurement may support wide bandwidths and large path losses, but do not resolve fast changing channels due to very slow measurement speeds of the VNA. Furthermore, the transmitter and receiver must be tethered to the VNA using low-loss microwave cables, which limits the sounding range and movement of the transmitter and receiver, thus limiting testing scenarios.

The wide-band high-speed channel sounding measurements made using an AWG is limited to a maximum of 1-2 GHz bandwidth. Also, the sounding measurements are performed under high signal to noise ratios (SNR), which severely limit maximum path loss and therefore the maximum range. Only narrow band channel sounding measurements (e.g., about 100 MHz wide 5 GHz new radio (NR)) is possible with high path loss and long range. Triggered measurements of each sounding signal are susceptible to clock jitter in trigger timing, especially with an M8131A digitizer, for example, available from Keysight Technologies, Inc. Unless removed, this jitter does not allow coherent averaging to improve upon path loss due to long range. Also, synchronized Rubidium clocks needed to be used at the transmitter and the receiver sites to reduce timing drift.

The VSA based channel sounding using Golay code sequences involves basically BPSK/QPSK modulation with significant out-of-band spectrum that creates unwanted channel impulse response (CIR) due to out-of-band group delay variations. Also, the VSA based channel sounding is not able to track for clock timing drift or resolve Doppler, and suffers from high SNR requirements and reduced path loss and range. Using UWB channel sounding, only a single measurement campaign is needed to measure and extract the models of all the sub-channels that are within the measurement bandwidth.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
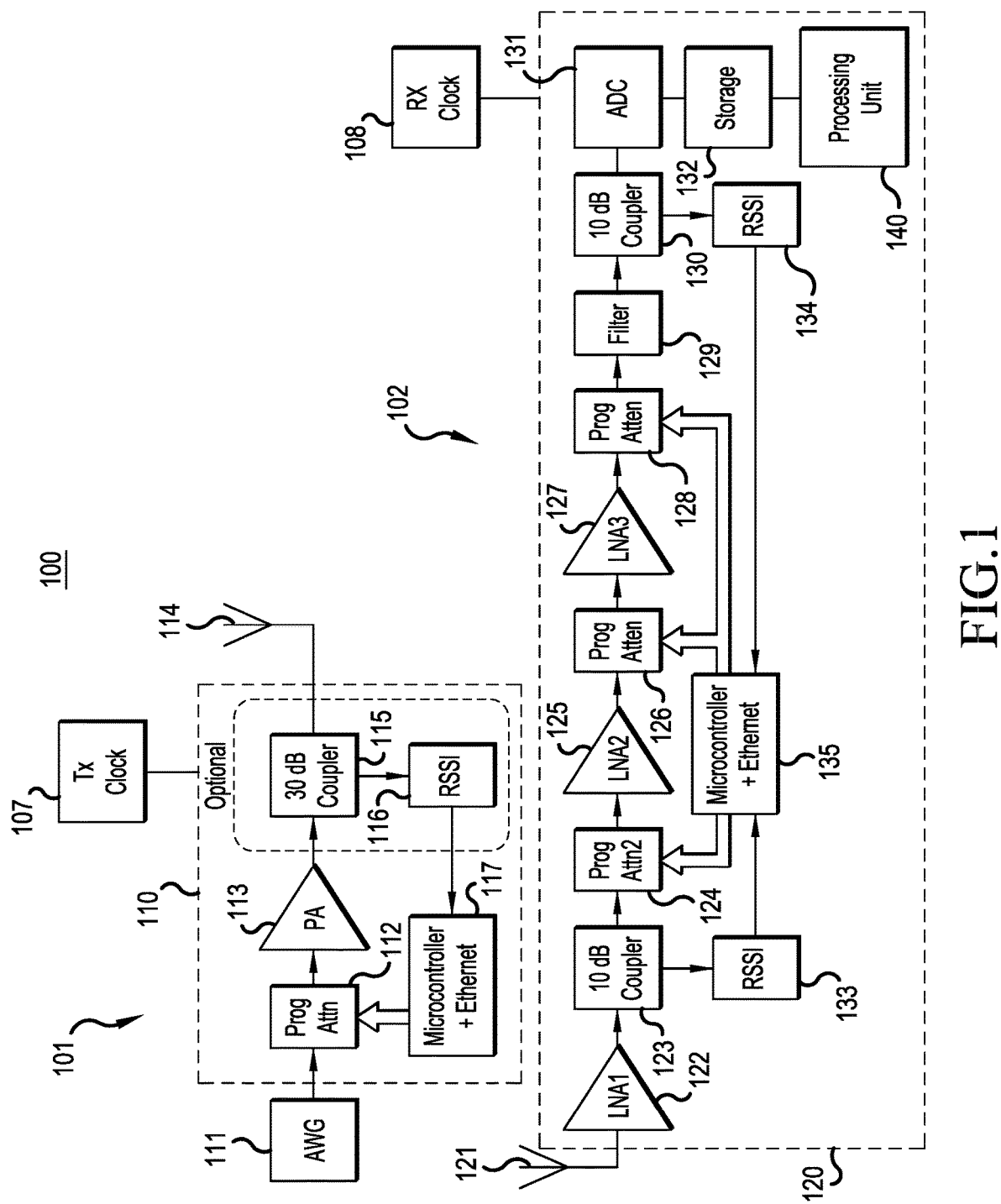
FIG. 1 is a simplified block diagram of a system for performing channel sounding for modeling ultrawideband radio frequency (RF) channels, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

The various embodiments are in the technical field of measuring and testing electrical devices, and are directed more particularly to performing UWB channel sounding. According to the various embodiments described herein, channel sounding data is provided for modeling ultrawideband (UWB) radio frequency (RF) signals. The channel sounding data enables measurement of fast changing wireless channels over extremely wide bandwidths, such as 10 GHz, as well as very large path loss, such as 120 dB, that occurs over long ranges and large path delays that result in SNR being significantly below 0 dB. The embodiments obviate the need for Rubidium clocks at the transmitter and receiver sites with regard to timing drift related issues. Conventional high-speed channel sounding techniques are limited to much narrower bandwidths at SNRs significantly above 0 dB. Such techniques also tolerate much smaller path loss and required Rubidium clocks for timing drift mitigation.

Another advantage of the various embodiments is that only a single initial sliding correlation needs to be performed at the start of streaming data to resolve t=0, i.e., the start of the sounding signal. Thereafter, the consecutive soundings are automatically resolved for their start times by using clock values at integer multiples of the symbol length (in clocks). Also, conventional techniques must perform a sliding correlation for each sounding to find t=0, which requires an enormous amount of post processing, and typically requires synchronization to a pulse per second (PPS) timing accurate hardware signal.

Conventional techniques also use hardware triggers for each sounding, which creates much clock jitter since the hardware triggers are asynchronous to the clock. The clock jitter in turn degrades Doppler frequency measurements. The various embodiments do not utilize hardware triggers, and therefore do not suffer from clock jitter or limitations resulting from clock jitter.

In a representative embodiment, a system is provided for performing channel sounding for modeling ultrawideband RF channels. The system includes a transmitter and a receiver. The transmitter includes a signal generator configured to generate an ultrawideband RF signal and to modulate the ultrawideband RF signal with a sounding waveform, where the sounding waveform includes streaming data including multiple conforming sounding symbols, which include no gaps between consecutive conforming sounding symbols, where the transmitter is configured to transmit the ultrawideband RF signal according to a transmit sampling clock, where the transmit sampling clock and a carrier frequency of the ultrawideband RF signal are derived from a transmit common local reference frequency. The receiver is configured to receive the ultrawideband RF signal according to a receive sampling clock, where the receiver includes an analog to digital converter (ADC) configured to digitize the ultrawideband RF signal according to a first sampling rate to provide a digitized signal; a digital local oscillator configured to perform digital down conversion of the digitized signal to a baseband digitized signal comprising the streaming data, where the receive sampling clock and a digital local oscillator are derived from a receive common local reference frequency; and a processing unit. The processing unit is configured to filter the baseband digitized signal to remove an out-of-band portion of the baseband digitized signal; resample the filtered digitized signal according to a second sampling rate, where the second sampling rate is a conforming sampling rate; perform cross-correlation between the resampled digitized signal beginning segment and an ideal symbol to establish a notional start time; convert the streaming data of the resampled digitized signal into multiple packets based on the notional start time of the streaming data, where each packet is formed of at least two consecutive conforming sounding symbols in the streaming data and where the start sample or time of each packet is implicitly known based on the notional start time of the streaming data; perform coherent averaging of the multiple packets over a predetermined number of consecutive packets of the multiple packets to obtain multiple coherently averaged packets; determine an un-equalized channel impulse response (CIR) for each coherently averaged packet of the multiple coherently averaged packets by performing a time-domain cross-correlation between the ideal reference symbol and the coherently averaged packets; determine an un-equalized channel frequency response (CFR) for each coherently averaged packet of the plurality of coherently averaged packets by performing a fast Fourier transform (FFT) of the un-equalized CIR for each coherently averaged packet; determine an equalized CFR based on the un-equalized CFR for each coherently averaged packet; and determine an equalized CIR based on the equalized CFR for each coherently averaged packet. The processing unit is further configured to perform at least one of modeling an ultrawideband RF channel of the communication system using the equalized CIR, and converting the modeled ultrawideband RF channel into a sparse tap-delay channel model for each coherently averaged packet; or modeling a sub-band of the ultrawideband RF channel of the communication system using a windowed sub-band of the equalized CFR, and converting the modeled sub-band into a sub-band sparse tap-delay channel model for each coherently averaged packet.

In another representative embodiment, a method is provided for performing channel sounding for modeling ultrawideband RF channels. The method includes modulating an ultrawideband RF signal with a sounding waveform at a transmitter of a communication system, where the sounding waveform includes streaming data including multiple conforming sounding symbols, where the multiple conforming sounding symbols include no gaps between consecutive conforming sounding symbols; transmitting the ultrawideband RF signal from the transmitter according to a transmit sampling clock, where the transmit sampling clock and a carrier frequency of the ultrawideband RF signal are derived from a transmit common local reference frequency; receiving the ultrawideband RF signal at a receiver of the communication system according to a receive sampling clock, where the receive sampling clock and a digital local oscillator are derived from a receive common local reference frequency; digitizing the ultrawideband RF signal according to a first sampling rate; performing digital down conversion of the digitized signal to baseband using a digital local oscillator, where the baseband digitized signal comprises the streaming data; filtering the baseband digitized signal to remove an out-of-band portion of the baseband digitized signal; resampling the filtered digitized signal according to a second sampling rate, where the second sampling rate is a conforming sampling rate; performing cross-correlation between the resampled digitized signal beginning segment and an ideal symbol to establish a notional start time; converting the streaming data of the resampled digitized signal into a multiple packets based on the notional start time of the streaming data, where each packet is formed of at least two consecutive conforming sounding symbols in the streaming data and where the start sample or time of each packet is implicitly known based on the notional start time of the streaming data; performing coherent averaging of the multiple packets over a predetermined number of consecutive packets of the multiple packets to obtain a multiple coherently averaged packets; determining an un-equalized CIR for each coherently averaged packet of the multiple coherently averaged packets by performing a time-domain cross-correlation between the ideal reference symbol and the coherently averaged packets; determining an un-equalized CFR for each coherently averaged packet of the multiple coherently averaged packets by performing an FFT of the un-equalized CIR for each coherently averaged packet; determining an equalized CFR based on the un-equalized CFR for each coherently averaged packet; and determining an equalized CIR based on the equalized CFR for each coherently averaged packet. The method further includes performing one or more of modeling an ultrawideband RF channel of the communication system using the equalized CIR, and converting the modeled ultrawideband RF channel into a sparse tap-delay channel model for each coherently averaged packet; and modeling a sub-band of the ultrawideband RF channel of the communication system using a windowed sub-band of the equalized CFR, and converting the modeled sub-band into a sub-band sparse tap-delay channel model for each coherently averaged packet.

While the embodiments described herein apply to a single input single output (SISO) channel sounding, they may be extended to multiple input multiple output (MIMO) channel sounding, as well as beamforming channel sounding, without departing from the scope of the present teachings.

FIG. 1 is a simplified block diagram of a system for performing channel sounding for modeling ultrawideband (UWB) RF channels, according to a representative embodiment.

Referring to FIG. 1, communication system 100 includes a transmit station 101 and a receive station 102. The transmit station 101 includes a signal generator 111, a transmitter 110, a transmit antenna 114, and a transmit sampling clock 107. In the depicted embodiment, the transmitter 110 includes a programmable attenuator 112 and a power amplifier 113. Optionally, the transmitter 110 may also have a signal feedback path that includes an RF coupler 115 (e.g., 30 dB directional coupler), a received signal strength indicator (RSSI) 116 and a microcontroller 117. The microcontroller 117 provides a control signal to the programmable attenuator 112 based on the signal strength detected by the RSSI 116 to provide automatic gain control (AGC) gain control. The purpose of the transmitter AGC is to ensure that a receiver 120 in the receive station 102 is not overloaded during short range channel sounding under strong received signal levels.

The signal generator 111 may be an AWG, for example, configured to generate an ultrawideband RF signal, and to modulate the ultrawideband RF signal with a complex baseband sounding waveform. The complex baseband sounding waveform is typically provided by programming code, such as MATLAB based code, that generates and uploads signal samples into the memory of the signal generator 111. The signal generator 111 up-samples the signal and then digitally upconverts the signal to an RF carrier as a real signal that is then converted to an analog signal by a digital to analog converter (DAC) (not shown), and then transmitted. The signal generator 111 repeats the sounding signal without any gaps. The sounding waveform includes streaming data including multiple conforming sounding symbols. There are no gaps between consecutive (adjacent) sounding symbols of the streaming data, and the sounding symbols have zero signal phase at respective boundaries. For example, the conforming sounding symbols of the sounding waveform may include a very long Zadoff-Chu sequence of points (e.g., 24,576 points) to partly mitigate the path loss, e.g., by the processing gain of $10*\log 10(24,576)$.

The sounding waveform has a bandwidth, sampling rate, carrier frequency and autocorrelation properties appropriate for performing the channel sounding. For example, the sounding waveform has autocorrelation is equal to 0 for $Tc \leq |\tau| < T_{sym}$, and autocorrelation is equal to 1 for $\tau=0$, where $\tau$ is the correlation delay, $T_c$ is the chip period with the symbol including N chips (samples), and $T_{sym}$ is the symbol period (duration) ($T_{sym}=N*T_c$). The ultrawideband RF signal has a carrier with a carrier frequency $F_c$, preferably with a zero signal phase at the boundaries of the sounding symbols, where $2\pi*F_c*T_{sym}$ is equal to integer multiples of $2\pi$.

At the transmitter 110, a transmit common local reference frequency is used for generating the up-sampled transmit sampling clock 107 of a DAC (not shown), as well as for an analog RF carrier frequency generation synthesizer, or for digital up conversion field programmable gate array (FPGA) clocks and an RF output DAC clock of the DAC in the signal generator 111, mentioned above. At the receiver 120 in the receive station 102, a receive common local reference frequency is used for a receive sampling clock 108 when the receiver 120 includes an analog to digital converter (ADC) 131 that performs direct RF sampling and is followed by optional digital down conversion (DDC) in an FPGA. Otherwise, the receive common local reference frequency may be used for a local oscillator (LO) generation synthesizer (not shown) for analog down conversion of the received ultrawideband RF signal and for the receive sampling clock 108 of the ADC 131 after the output of the analog down converter. For short range channel sounding, the individual clocks discussed herein and their corresponding frequencies are derived from a master reference frequency clock (not shown), which is common to both the transmitter 110 and the receiver 120, to ensure that the parts per million (PPM) relative frequency error is zero for the clocks with regard to their respective frequencies. For long range channel sounding, the individual clocks discussed herein and their corresponding frequencies are derived from local master reference frequency clocks (not shown), which is not common to both the transmitter 110 and the receiver 120, and therefore there will be some PPM relative frequency error between the transmitter 110 and the receiver 120. The PPM relative frequency error will be same for the clocks and the carrier frequencies and this is an important requirement as the receiver clock relative frequency error is computed based on the computed receiver carrier frequency relative error.

The programmable attenuator 112 provides AGC at the transmitter 110, as mentioned above. The programmable attenuator 112 is configured to change only one gain out of many at any given path loss, i.e., for a received power level. This helps in identifying a sounding sequence of conforming sounding symbols in which the gain has changed, and thereby excluding that sounding sequence from coherent averaging at the receive station 102, discussed below. The AGC maintains the best possible SNR, and prevents overloading in the transmit and receive stations 101 and 102 and clipping of the digitizer in the receive station 102, also discussed below. AGC control of the programmable attenuator 112 is time-stamped, but due to latency in actual gain changes, post-processing may be performed to actually identify the sounding sequence where the power level changes after the timestamp.

The transmitter 110 is configured to transmit the ultrawideband RF signal modulated by the sounding waveform according to the transmit sampling clock 107. The transmit sampling clock 107 and the transmit carrier frequency of the ultrawideband RF signal are derived from the transmit common local reference frequency mentioned above. This ensures that the transmit clock and the transmit carrier frequency both have the same relative fractional frequency error that is typically measured in PPM. Similarly, at the receiver 120, the receiver clock and the receiver carrier frequency will have the same relative frequency error in PPM as they are both derived from a common receiver reference frequency. The ultrawideband RF signal is transmitted to the receive station 102 via the transmit antenna 114.

The receive station 102 includes a receive antenna 121, the receiver 120, and the receive sampling clock 108. For purposes of illustration, the receive station 102 includes a single channel with the receiver 120, although it is understood that the receive station 102 may include multiple channels of the same configuration for capturing or digitizing measured channel (multipath) signals. Further, the process of performing channel sounding to model an ultrawideband RF channel requires performing channel sounding for a reference channel and then repeating the channel sounding for a multipath channel of the receiver. It is understood that the channel shown in the receive station 102 is representative of both the reference channel and the multipath channel.

The receive sampling clock 108 is common to an ADC sampling clock of the ADC 131, as well as to an analog or digital LO generation clock of the generation synthesizer LO and analog or digital down conversion. This ensures that both the receiver LO frequency and the ADC sampling clock have the same fractional frequency error that is typically measured in PPM. The receiver 120 receives the ultrawideband RF signal via the receive antenna 121, which is subsequently sampled according to the receive sampling clock 108 derived from the receive common local reference frequency mentioned above. In an embodiment, the receive common local reference frequency may be provided by master reference frequency clock, mentioned above. In another embodiment, the transmit common local reference frequency at the transmitter 110 and the receive common local reference frequency at the receiver 120 use separate Rubidium clocks that are synchronized.

In the depicted embodiment, the receiver 120 includes first RF coupler 123 (e.g., 10 dB directional coupler), first programmable attenuator 124, first low noise amplifier (LNA) 125, second programmable attenuator 126, second LNA 127, third programmable attenuator 128, filter 129, second RF coupler 130 (e.g., 10 dB directional coupler), ADC 131, storage unit 132, and the processing unit 140. The receiver 120 may also have a feedback path that includes a first RSSI 133 connected to the first RF coupler 123, a second RSSI 134 connected to the second RF coupler 130, and a microcontroller 135. The microcontroller 135 provides control signals to the first, second and third programmable attenuators 124, 126 and 128 respectively, based on signal strengths detected by the first RSSI 133 and the second RSSI 134 to provide AGC. The AGC at the receiver 120 is thus controlled in a manner that optimizes the signal to noise plus distortion ratio (SNDR) at the input of the ADC 131 for a given signal level at the receive antenna 121.

The ADC 131 is configured to digitize the ultrawideband RF signal according to a first sampling rate to provide a digitized RF signal. The digitized RF signal may be considered a measured channel signal during calibration and a measured multipath channel signal during multipath channel measurements. In an embodiment, a Hilbert transform of the digitized RF signal may optionally be performed in order to remove an image spectrum of the digitized RF signal. Performing the Hilber transform includes transforming the digitized real signal to the frequency domain using a fast Fourier transform (FFT), setting negative frequency terms of the frequency domain signal to zero, and transforming the frequency-domain signal back to a time domain complex signal using an inverse FFT (IFFT). The Hilber transformed digitized signal thus excludes a negative frequency image.

The digitized RF signal is a long chunk of channel sounding streaming data that has been stored for analysis, e.g., in the storage unit 132. The streaming data may be up to an hour long recording, including approximately 350 terabytes (TB) of data, for example. Only a selected part of the total recording is analyzed at a time considering the processing time and memory requirements of the processing unit 140. For example, only about one second of 6 GHz wide streaming data at a 32 GHz sampling rate of the ADC 131, including 32 Gsamples, is processed at a time. One second streaming data includes about 250,000 sounding symbols. In addition, a reference channel is measured using 100-200 gapless consecutive sounding symbols to obtain a measured reference signal. The reference signal may be captured or digitized during calibration and measurement of the reference channel. The reference channel may be measured either by directly connecting respective RF ports of the transmitter 110 and the receiver 120 via a through-connect, or by placing the transmit and receive antennas 114 and 121 in close proximity to each other (e.g., less than about 1 meter) in an anechoic chamber to minimize reflections of the signal.

The receiver 120 may include an analog LO and a mixer (not shown) configured to down convert the received ultrawideband RF signal to an intermediate frequency (IF), followed by the ADC 131 digitizing the down-converted signal at the IF frequency. The digitized down-converted IF signal is subsequently digitally down converted to a complex baseband digitized signal. Alternatively, the receiver 120 may include a digital LO (not shown) in a digital down converter (DDC) (not shown) following the ADC 131 In this case, the DDC is configured to perform digital down conversion of the digitized RF signal to baseband to provide the baseband digitized signal. The baseband digitized signal includes the streaming data from the transmitted ultrawideband RF signal, including the sounding symbols.

The storage unit 132 is configured to store the baseband digitized signal. The baseband digitized signal may need to be stored for a period of time, e.g., up to 1 hour, of channel recording, which may be 350 TB in size. Parts of the stored baseband digitized signal may be extracted later in non-real-time and post-processed for computing CIR, CFR, and/or Doppler, discussed below. The storage unit 132 may be implemented using any type of non-transitory storage medium, as discussed below with reference to memory 820 and database 850 in FIG. 8. The storage unit 132 may use a high-speed optical data interface, for example.

Figure 8:
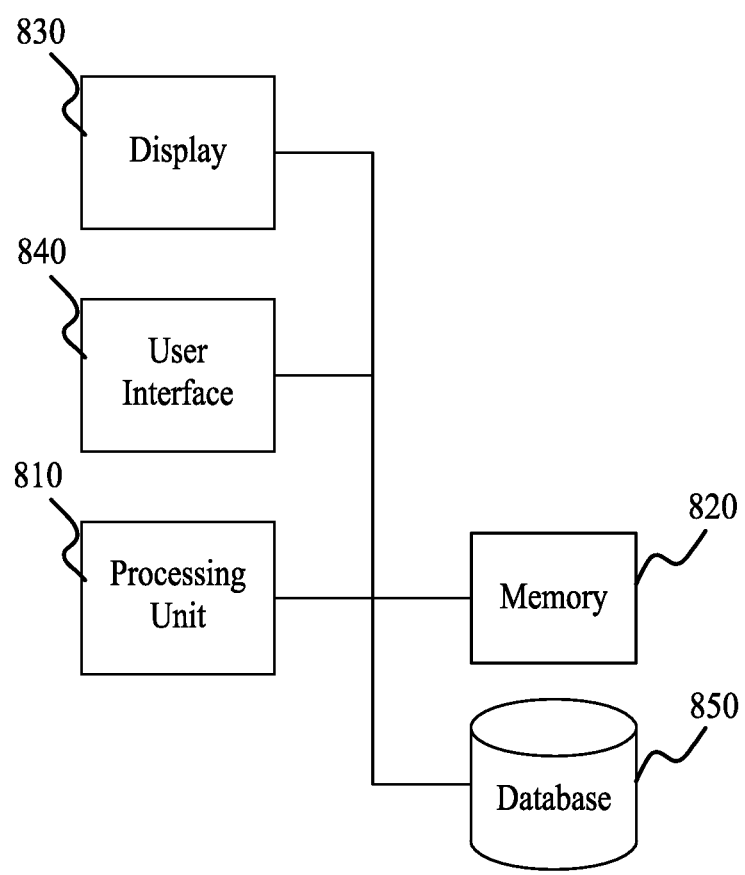
FIG. 8 is a simplified block diagram of a representative processing unit, according to a representative embodiment.

The processing unit 140 is configured to perform digital signal processing on the baseband digitized signal retrieved from the storage unit 132. The processing unit 140 may be implemented as shown in FIG. 8, for example, discussed below.

The processing unit 140 implements a low-pass digital filter configured to perform low-pass filtering of the baseband digitized signal output from the storage unit 132. The low-pass filtering removes an out-of-band portion of the baseband digitized signal and outputs a filtered digitized signal. The low-pass digital filtering may be implemented as a digital finite impulse response (FIR) filter, for example. In the embodiment that includes performing the Hilbert transform of the digitized RF signal, the low-pass digital filtering may be relaxed due to the absence of the image spectrum, meaning that the order or the number of taps in the digital FIR filter may be reduced to less than half of the original value, which is typically 100 or more taps for implementing sharp band edges in the filter. When the Hilbert transform is not included, the low-pass digital filtering is a high order signal configured to remove the image signal.

The processing unit 140 resamples the filtered digitized signal according to a second sampling rate to provide a resampled digitized signal. The second sampling rate is a conforming sampling rate, and is typically less than the first sampling rate. A conforming sampling rate means that the number of samples per symbol is an integer multiple of the number of chips. Alternately, conforming sampling rate means that the number of samples per chip is an integer. For example, the conforming sampling rate may be a low integer multiple of the chip rate, which is typically the bandwidth of the sounding symbol. For example, when the chip rate is 6 GHz, the resampling rate may be five times the chip rate, which is 30 GHz. This results in resampling the filtered digitized signal from 32 GHz, for example, to 30 GHz.

The processing unit 140 performs cross-correlation between the beginning segment (symbol) of the resampled digitized signal and an ideal reference symbol to establish a notional start time at t=0. The ideal reference symbol may be defined as a constant amplitude and zero autocorrelation (CAZAC) sequence. It can be a Zadoff-Chu sequence, for example, with a long length, like 24 k points, or a sequence with properties of zero autocorrelation and near-constant amplitude as described in U.S. Patent Publication No. 2014/0327644 to Mohindra, and U.S. Patent Publication No. 2014/0341411 to Mohindra et al., which are hereby specifically incorporated by reference in their entireties. Performing the cross-correlation may include a sliding cross-correlation over three or more symbol periods $T_{sym}$ of the beginning segment of the streaming data. The second correlation peak out of three consecutive near-equal correlation peaks of the symbol periods $T_{sym}$ may be identified as t=0 since the second correlation peak will always encompass a full-symbol for correlation, compared to the first correlation peak, which typically encompasses only a partial symbol in the correlation and is therefore smaller in amplitude. The notional start time establishes the reference time for the entire channel sounding campaign, which may be an hour or more long, producing aligned streaming data of the sounding waveform. Accordingly, t=0 does not need to be re-computed for each sounding symbol in the steaming data, as compared to conventional techniques that use burst of symbols, which do need to re-compute t=0 for each sounding burst of symbols and thus require an enormous amount of processing power, and is also prone to jitter in the hardware trigger signal generally used for burst soundings. Jitter degrades the estimation of the Doppler frequency in the channel sounding.

Cross-correlation between the beginning segment (symbol) of a reference signal and an ideal reference symbol is also performed to establish a notional start time at t=0, producing an aligned reference signal.

The processing unit 140 converts the streaming data of the resampled digitized signal into packets based on the notional start time of the streaming data. Each packet is formed of at least two consecutive conforming sounding symbols in the streaming data. For example, the streaming data may be converted to packets of three consecutive sounding symbols, where each packet is offset by one sounding symbol relative to the previous packet. The start sample or start time of each packet is implicitly known based on the notional start time of the first packet of the streaming data. Therefore, the start times may be determined without having to cross-correlate each packet with the ideal reference symbol, as in conventional techniques.

The processing unit 140 performs coherent averaging of the packets over a predetermined number (N) of consecutive packets to obtain coherently averaged packets. The coherent averaging is performed by more than factor 1, where factor 1 implies no coherent averaging being performed, and typically in a range of at least 10 consecutive packets (e.g., in a range of 10 to 1000 packets). Coherently averaging the packets over the N consecutive packets improves processing gain by 10*log 10(N) dB. For example, when N=100, the processing gain improves by 20 dB. The coherent averaging is particularly useful when the channel path loss becomes excessive, even over short distances, especially considering that the SNR already is reduces by about 18 dB for an ultrawideband RF signal (e.g., 6 GHz wide) as compared to a relatively narrower band signal in 5G new radio (NR) channel (e.g., 100 MHz wide) using similar transmit powers.

Figure 2:
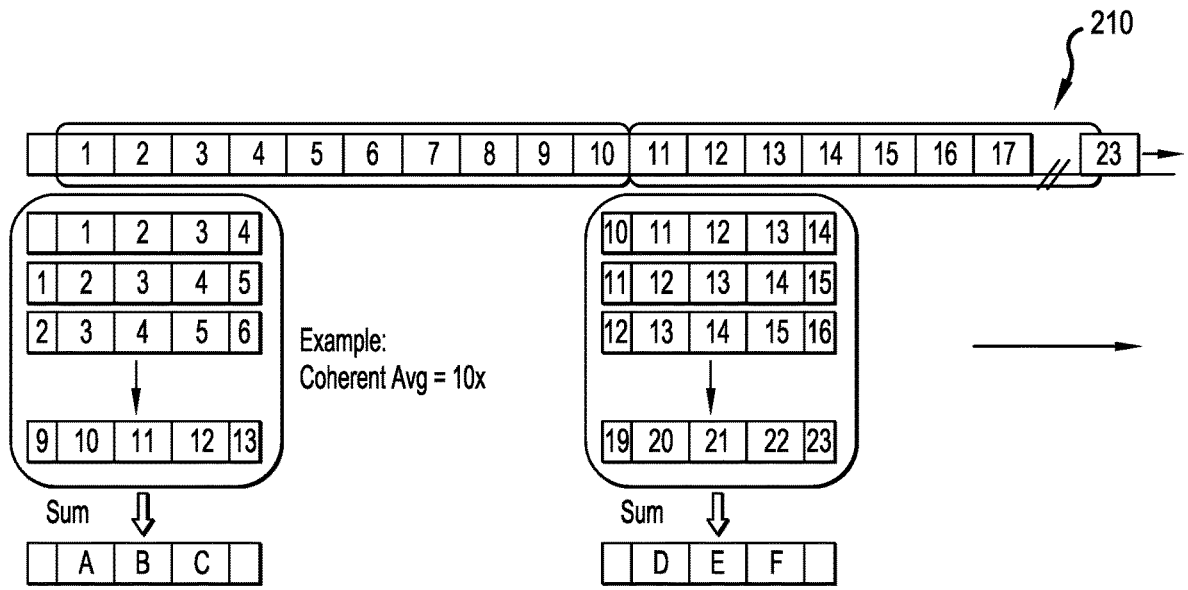
FIG. 2 shows an example of coherently averaging 10 packets, according to a representative embodiment.

In an embodiment, each of the coherently averaged packets may include two or three symbols, although more packets may be coherently averaged without departing from the scope of the present teachings. FIG. 2 shows an example of coherently averaging 10 packets, according to a representative embodiment. Referring to FIG. 2, streaming data 210 shows 23 packets which include no gaps in between (gapless packets), as discussed above with regard to gapless consecutive sounding symbols. In the depicted example, packets 1 to 12 are coherently averaged into three coherently averaged packets A, B and C, and packets 11 to 23 are coherently averaged into coherently averaged packets D, E and F. This is done by summing the consecutive packets and dividing by 10 to provide the first coherently averaged packet A, shifting the packets by one, summing the consecutive symbols again and dividing by 10 to provide the second coherently averaged packet B, shifting the packets by one, summing the consecutive symbols again and dividing by 10 to provide the third coherently averaged packet C, and so on, as shown in FIG. 2. Notably, since there are no gaps between the packets, only the first packet (packet 1) needs to be time aligned, and the remaining packets are aligned automatically. An RF channel may be estimated for each coherently averaged packet. The RF channel may be a multipath channel or any radiated or conducted propagation channel that needs to be measured.

The processing unit 140 determines an un-equalized channel impulse response (CIR) and an un-equalized channel frequency response (CFR) for estimating an RF channel for each coherently averaged packet. The un-equalized CIR may correspond to a sliding cross-correlation of an ideal reference symbol over a middle symbol in each coherently averaged packet. After coherent averaging, the resultant coherently averaged packets have two or more consecutive sounding sequences over which a sliding correlation may be done to extract the un-equalized CIR. The un-equalized CIR may be determined by performing a time-domain cross-correlation between the ideal reference symbol and the measured coherently averaged packet. For example, the un-equalized CIR may correspond to a sliding cross-correlation of the ideal reference symbol, mentioned above, over a middle symbol in each coherently averaged packet. The un-equalized CFR is determined by performing an FFT of the un-equalized CIR for each coherently averaged packet.

Figure 3:
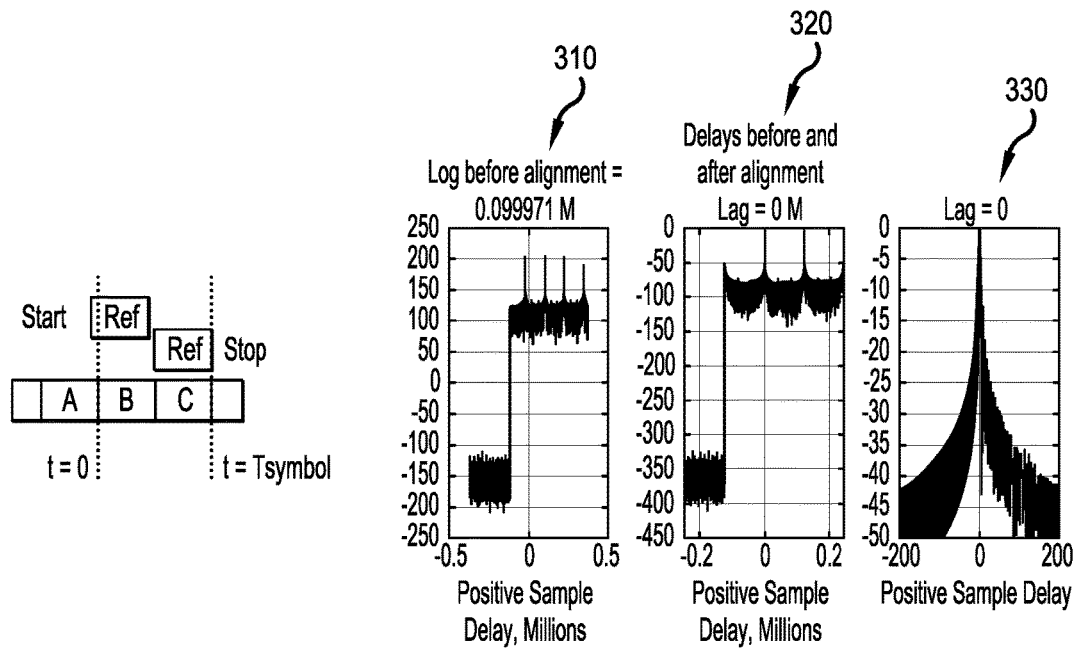
FIG. 3 shows an example of performing sliding correlation over coherently averaged packets to obtain un-equalized CIR, according to a representative embodiment.

FIG. 3 shows an example of performing sliding correlation (cross-correlation) over the coherently averaged packets shown in FIG. 2 to obtain un-equalized CIR, according to a representative embodiment. That is, the cross-correlation is a sliding cross-correlation of the ideal reference symbol over multiple gapless consecutive measured symbols. The measured symbols include reference symbols measured during reference calibration and symbols for actual (multipath) channel measurement. Referring to FIG. 3, time alignment is performed on the coherently averaged packets A, B and C using reference symbols. The reference symbols may be a Zadoff-Chu sequence, for example. Graph 310 shows the cross-correlation versus time delay or lag of the ideal reference symbol and the coherently averaged packet comprising three consecutive symbols A-B-C before alignment. The horizontal axis is the time delay in the cross-correlation. The delay corresponding to the second correlation peak out of three consecutive near-equal correlation peaks of the symbol periods $T_{sym}$ may be identified as t=0 as it will always encompass the full-symbol "B" for correlation, compared to the first peak that might encompasses only a partial symbol in the correlation and is therefore could be smaller in amplitude. Graph 320 shows the cross-correlation versus time delay or lag after alignment, where the second peak of Graph 320 is at t=0. Graph 330 is a zoomed-in view of Graph 320 at time t=0 after alignment, showing un-equalized CIR.

The processing unit 140 further determines an equalized CFR of the multipath channel based on two un-equalized CFR measurements, one for the coherently averaged packet of the multipath channel, and the other for the coherently averaged reference channel packet. In an embodiment, the equalized CFR of the multipath channel may be determined by dividing its un-equalized CFRs by the un-equalized CFR of the reference signal. More specifically, determining the equalized CFR may include calculating H(f)=Y(f)/X(f), where Y(f) is an FFT of un-equalized CIR of the coherently averaged packet and X(f) is an FFT of un-equalized CIR of a reference signal, where the reference signal comes from an initial measurement of a reference channel measurement.

In another embodiment, the equalized CFR may be determined by applying a Weiner Filter, which minimizes effects of noise and distortion. The Weiner Filter is implemented using $S_{xy}/S_{xx}$ in frequency domain, where $S_{xy}$ is cross-spectral density of the channel un-equalized CFR and the reference un-equalized CFR, and $S_{xx}$ is the un-equalized spectral density of the reference given by the square of its un-equalized CFR. The Weiner Filter may be equivalently implemented in the time-domain using a Yule-Walker technique or a Least Squares method. The CFR of the reference signal is determined by performing an FFT of a cross-correlation between the ideal symbol and a measured reference signal in the reference channel. The reference signal may be measured by removing a direct channel between the transmitter 110 and the receiver 120, either by directly connecting respective RF ports to one another or by bringing the transmit antenna 114 and the receive antenna 121 in close proximity to one another within an anechoic chamber, as also described above. The measured reference signal may be a coherent average of about 100-200 measured reference symbols, for example.

In any case, once the equalized CFR is determined, the equalized CIR may be determined based on the equalized CFR. For example, the equalized CIR may be determined by taking the IFFT of the equalized CFR for each coherently averaged packet.

Figure 4A:
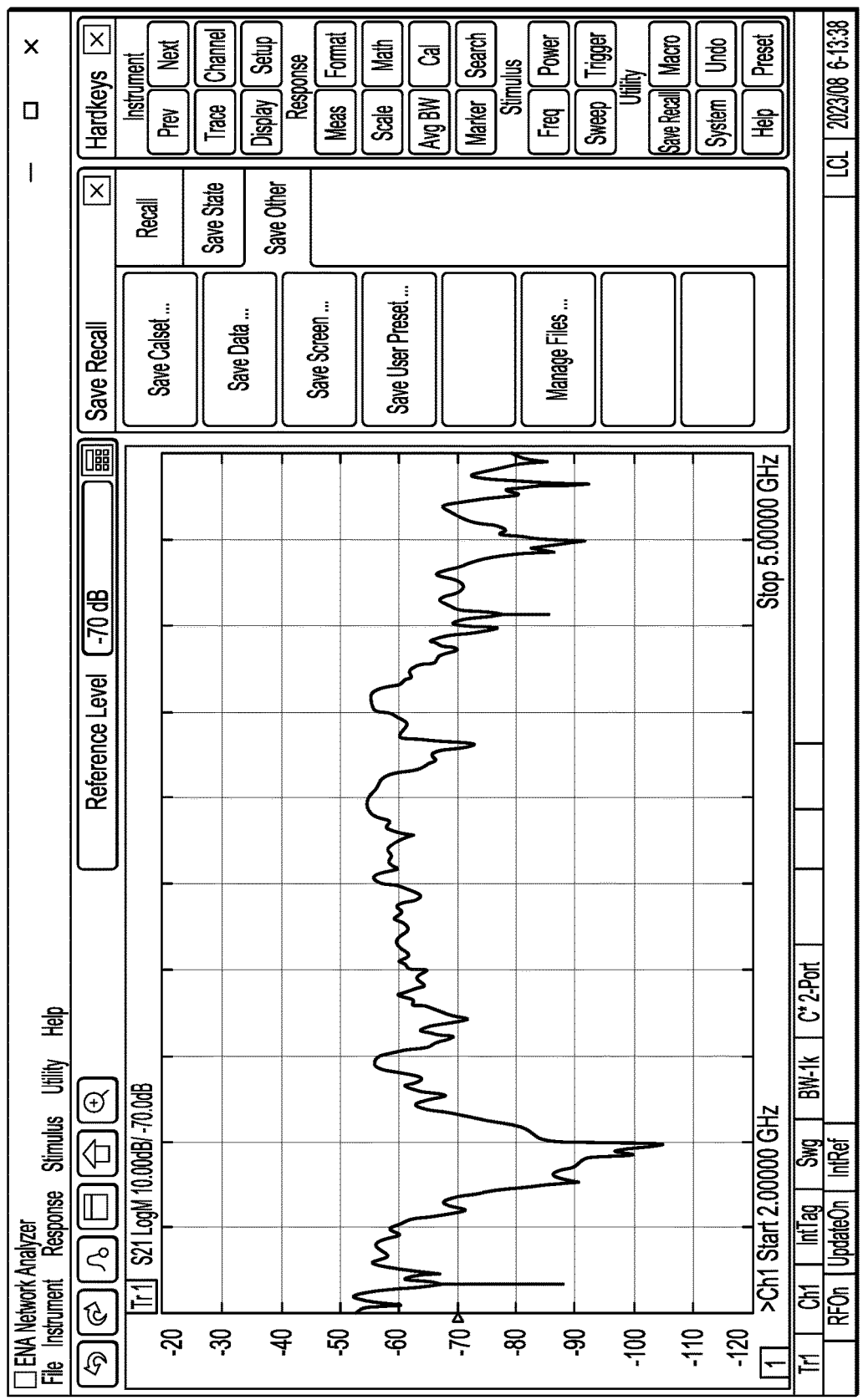
FIG. 4A shows a direct channel frequency response S21 (CFR) measurement using a VNA.
Figure 4B:
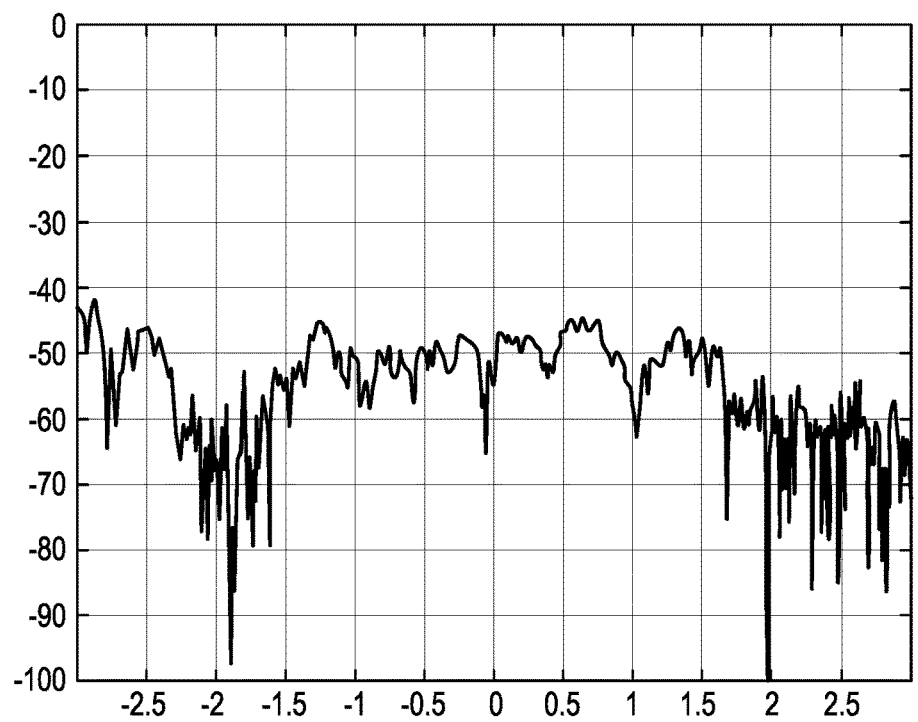
FIG. 4B shows equalized CFR of a communication system determined using conventional technique.
Figure 5:
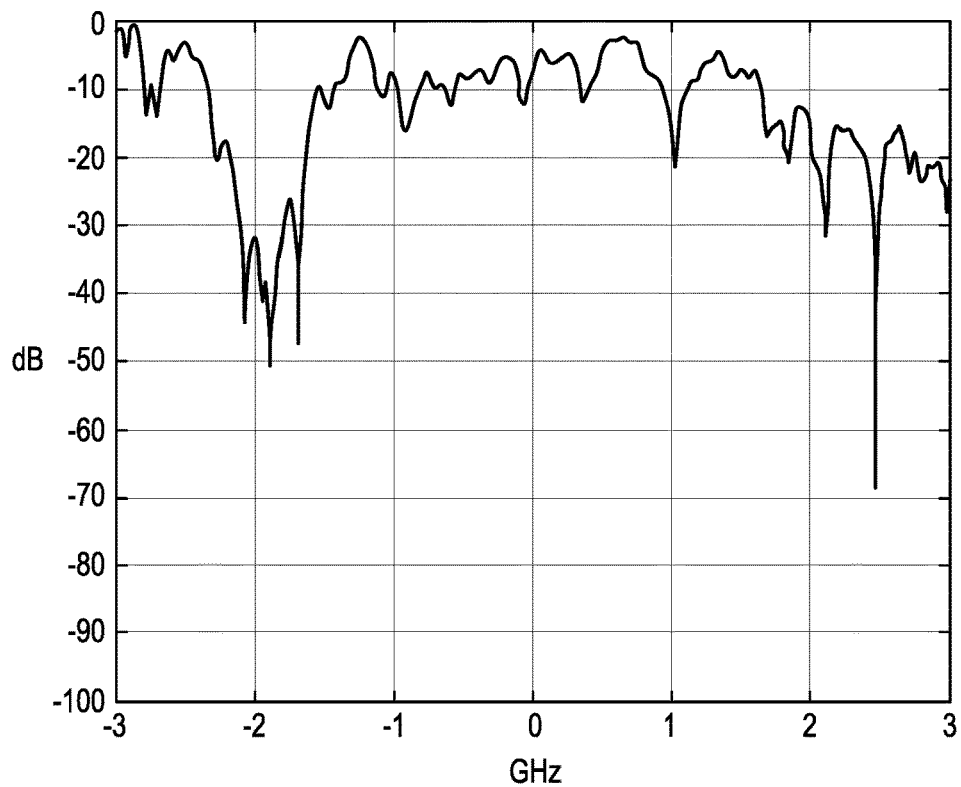
FIG. 5 shows equalized CFR of a communication system determined according to a representative embodiment.

FIG. 4A shows a direct channel frequency response S21 (CFR) measurement using a VNA for purposes of comparison, FIG. 4B shows equalized CFR of a communication system determined using conventional technique, i.e., without coherent averaging, and FIG. 5 520 shows equalized CFR of a communication system determined according to a representative embodiment, including gapless sounding symbols, clock-drift compensation, and coherent averaging, as discussed above. The graph in FIG. 4A is almost identical to the equalized CFR measurement of the UWB channel sounder indicated in the graph in FIG. 5. With coherent averaging the equalized CFR becomes less noisy and more closely resembles the VNA measurements. Notably, the vertical offset of the graphs in FIGS. 4B and 5 are not calibrated and are arbitrary, and the graph in FIG. 5 is normalized to the maximum value.

The processing unit 140 may model an ultrawideband RF channel of the communication system 100 using the equalized CIR. The modeled ultrawideband RF channel may be converted into a sparse tap-delay channel model for each coherently averaged packet. The tap-delay channel model is considered sparse in that it has a data size much smaller than a data size of the equalized CIR that covers every delay point over a symbol. For example, a 24 k-point Zadoff Chu sounding symbol translates to a CIR with 24 k delay points over a symbol at the fundamental sampling rate. On the other hand, the tap-delay model may contain only 100-200 delay points. A reconstructed CIR from the tap-delay model will match the original CIR very closely, typically with a correlation of 0.999 (close to 1) as an example, or with a peak error limited to −40 dBc as an example. Also, a sub-band of the wider ultrawideband RF channel of the communication system 100 may be modeled using a windowed sub-band of the equalized CFR. The modeled sub-band may be converted into a sparse sub-band tap-delay channel model for each coherently averaged packet.

Converting the modeled ultrawideband RF channel into the sparse tap-delay channel model includes selecting the frequency domain sub-band from the equalized CFR. This is done by applying a cosine-tapered window (e.g., a Tukey window) in the frequency domain to the sub-band. When Tukey parameter r=0, it defaults to a rectangular window, which is preferred for better sync-interpolation in the time domain. The windowed sub-band is down converted to 0 Hz by frequency shifting the sub-band. An IFFT of the down converted sub-band is performed to obtain the sub-band CIR. The sub-band window function is down converted to 0 Hz by frequency shifting the sub-band window function to 0 Hz. An IFFT of the down converted sub-band window function is performed to obtain the sub-band reference CIR. A CLEAN algorithm is then used to extract the sub-band tap-delay channel model with a limited number of taps that is much less than the total time points per sounding symbol, where the sub-band reference CIR is used as the reference kernel (reference CIR) and the down converted windowed sub-band CIR is used as the input CIR data.

More particularly, the CLEAN algorithm includes normalizing (reference) kernel R to a peak of 1, finding peak $A_1$ of the input CIR $C_1$ occurring at delay $T_1$, shifting the kernel R by delay $T_1$ so the peak of R aligns with peak $A_1$ to get kernel $R_1$, and computing residual input CIR as $C_2=C_1-A_1*R_1$. Then, the following steps are repeated, starting with the value n=2: finding peak $A_n$ of the residual input CIR $C_n$, exiting when $|A_n|<\eta|A_1|$, otherwise shifting the kernel R by delay $T_n$ so the peak of kernel R aligns with peak $A_n$ to get kernel $R_n$, and computing a new residual input CIR as $C_{n+1}=C_n-A_n*R_n$. With regard to $\eta$, the value of $20\log10(\eta)$ is typically chosen in the range of −40 to −20 dB, where there is a tradeoff between accuracy and the number of tap delays, and where $\eta$ is a chosen small constant value, such as 0.01 (equivalent to −40 dBc), so that the CLEAN algorithm stops when the magnitude of relative residual peak error is smaller than the value of $\eta$. The initial tap-delay channel model includes the series of pairs $(T_n, A_n)$. All $A_i$ (as $A_{sum1}$) that have the same $T_i$ value (of say $T_{common1}$) are summed, and all of these $(T_n, A_n)$ pairs are deleted and replaced with a consolidated single pair $(T_{common1}, A_{sum1})$. The final tap-delay channel model includes the new series of resulting pairs $(T_n, A_n)$ comprising of consolidated taps. The CLEAN algorithm steps are repeated for each successive channel sounding CIR.

In an embodiment, a Keysight PROPSIM channel emulator, available from Keysight Technologies, Inc., may be used for emulating the sub-band tap-delay channel model, for example. The PROPSIM channel emulator requires that the maximum number of taps be limited to 48 as an example. In this case, it is not advisable to simply throw away the consolidated taps having an index that is greater than 48 after being sorted on descending order of the tap weight. Doing this would degrade the accuracy of the reconstructed CIR because some of the lower weight taps that have been consolidated may have had a larger index compared to the unconsolidated case. Accordingly, it is better to sort and consolidate the taps at each iteration of the generation of the pairs $(T_n, A_n)$, and stop when the number of consolidated taps reaches 48, in which case additional taps with an index greater than 48 will not be produced after consolidation.

The sparse tap-delay channel model and the sub-band sparse tap-delay channel model may be used practically to emulate the RF channel for real-time playback of modulated signals. The system therefore provides an improvement in the technical fields of system design and testing and measurement. Some channel emulation hardware, such as the PROPSIM Channel Emulator, is limited to a maximum bandwidth of 250 MHz, and multiple sub-channels (up to 8) can be stitched together to create up to a 1.6 GHz wide real-time fading channel for playing back modulated signals. Each 250 MHz wide sub-channel requires its own tap-delay channel model that has been extracted for the corresponding frequency band from the measured fading channel. The faded signals from the outputs of the sub-channels are summed to produce the wideband faded signal.

Figure 6:
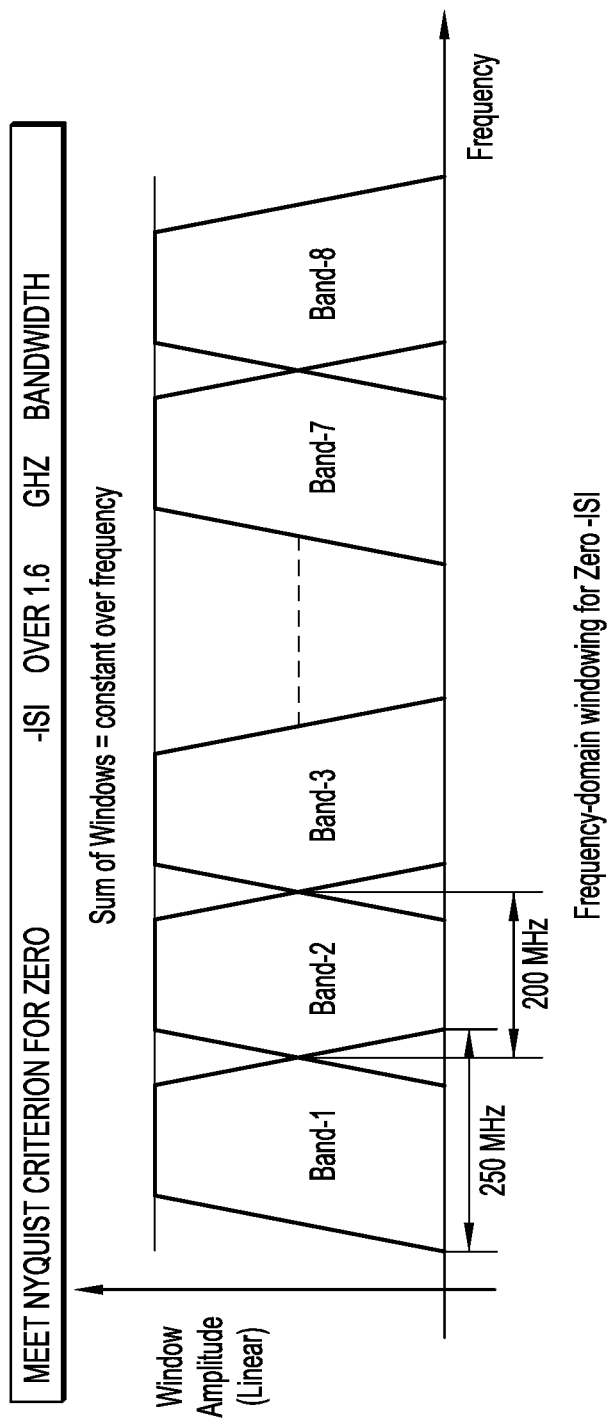
FIG. 6 shows a frequency domain windowing function, according to a representative embodiment.

The tap-delay extraction for each sub-channel is based on suitable frequency-domain windowing for each sub-channel, as shown in FIG. 6, which shows a frequency domain windowing function, according to a representative embodiment. The frequency domain windowing function must meet Nyquist criterion for zero-ISI that translates to the sum of the windows being constant over the required wider bandwidth ultrawideband RF signal. The CLEAN based tap-delay extraction of each sub-channel is the same as described above. The window function can be a cosine-tapered window (e.g., a Tukey window) with a small r-value (rolloff), such as 1 to 10 percent, for example, and with overlap cross-over occurring at 50 percent of the peak amplitude to meet the Nyquist criterion. Notably, the input signal is also filtered by the same window function of each channel before it is faded by the corresponding channel using its tap-delay data.

Also, in an embodiment, the processing unit 140 may extract a Doppler spectrum from the coherently averaged packets. There are two types of Doppler spectrum that may be extracted. One type of Doppler spectrum is extracted by performing an FFT of the equalized CIR, and the other type of Doppler spectrum is extracted by performing an FFT of the equalized CFR for each coherently averaged packet over time, i.e., packet index. The Doppler spectrum shows the frequency at which the channel is changing a) at each delay over the symbol duration, b) at each frequency over the channel bandwidth. The Doppler spectrum includes at Doppler frequency over delay (known as Doppler-delay) or Doppler frequency over channel frequency (known as Doppler-frequency). The Doppler-delay is a function of a Doppler frequency index and a delay index. The Doppler-frequency is a function of the Doppler frequency index and a channel frequency index. The Doppler spectrum may be used to build a stochastic channel model for simulating or emulating a communication or radar channel.

In an embodiment, the processing unit 140 may optionally corrects timing drift between the transmit sampling clock 107 and the receive sampling clock 108 by determining clock frequency offset (CFO) or error between the transmit sampling clock 107 and the receive sampling clock 108. The CFO is the average phase change per symbol divided by the symbol duration. The CFO may be known a priori from the reference signal based on initial calibration prior to the commencement of the actual channel sounding.

The normalized relative frequency error between the transmit sampling rate of the transmitter 110 and the receive sampling rate of the receiver 120 in PPM (e.g., when receiver is re-sampled to the transmit sampling rate) is the same as the normalized relative frequency error in PPM between the transmit carrier frequency of the ultrawideband RF signal transmitted by the transmitter 110 and the receive carrier frequency (function of receiver LO frequency) of the ultrawideband RF signal received by the receiver 120. This is because the sampling clocks and the carrier frequencies are derived from the individual transmit and receive common local reference frequencies at the transmit and receive stations 101 and 102, respectively. The transmit and receive common local reference frequencies between the transmitter 110 and the receiver 120 are typically independent and not locked, and therefore will have a relative frequency error in PPM. Therefore, the normalized relative CFO of the clock is the same as the normalized relative frequency error or offset of the carrier, and both are herein referred to by just CFO. By determining the normalized relative carrier frequency offset (or CFO) at the receiver 120 in PPM, the receive sampling clock 108 may then be corrected by the same amount to minimize timing drift.

The timing drift correction of each received symbol may be done in the frequency domain by imposing a phase ramp over frequency that corresponds to a delay correction in the time domain. The required delay correction increases linearly with time, requiring larger phase slopes in the frequency domain for consecutive sounding symbols. The timing drift delay correction changes the receive carrier frequency slightly, and therefore correction of this residual carrier frequency offset is performed next directly in the time domain using a phase ramp. The CFO is determined in the time domain using complex dot product of a symbol with the conjugate of the next consecutive symbol of a reference sounding signal, and taking the mean value over multiple symbols after removing outliers that show large deviation either from the median or rms values, or by simply removing the top and bottom one percent of sorted values, for example.

More particularly, the CFO between the transmit and receive sampling clocks 107 and 108 may be computed in Hz. The streaming data of the 30 GHz resampled digitized signal, mentioned above, drifts over consecutive symbols due to the CFO, which is typically around 1 PPM. Therefore, after about 200 sounding symbols, the receive sampling clock 108 may have drifted by a few clock cycles, making coherent averaging over 100-200 sounding symbols ineffective. Also, the absolute delays of the sounding symbols will drift and may add up to a significant amount after about one second, making subsequent absolute delay measurements inaccurate (relative to a 4 μsec or $T_{sym}$ symbol duration that is the maximum unambiguous path delay that can be resolved). Dot multiplication of S(n) and conjugate (S(n+1)) reference symbols is performed, and the mean angle P is computed over the N*Up samples, where Up=up-sampling=5. The mean angle P is the phase change per symbol period $T_{sym}$, and the CFO is $2\pi*P/T_{sym}$ in Hz. The CFO is computed over all the approximately 200 reference symbols, and median filtering may be done to remove outliers (e.g., discarding the top and bottom five values after sorting in ascending order). The mean CFO is computed from the remaining CFO values (e.g., approximately 190 CFO values after removing the 10 outlier symbols). This typically results in a mean CFO that is accurate to around 1 PPB, for example.

A table of sampling clock-drift versus sounding symbols may be generated using the mean CFO. $F_s$ is the nominal sampling frequency value in Hz common to both the transmitter 110 and the receiver 120, CFO is the relative sampling frequency error in Hz between the transmitter 110 and the receiver 120. The required table shows the amount of clock delay correction needed for each sounding symbol over the symbol index (i.e., over time normalized to symbol period). For example, the timing drift over sounding samples, normalized to a clock period, may be as follows:

L=number of clocks in the channel recording data;
ClockTx=(0:L−1).'; % increasing Transmitter clock number, from 0 to L−1;
ClockRx=ClockTx*(1+CFO1/$F_s$); % Corresponding Receiver clock number with timing error;
ClockError=ClockRx−ClockTx; % relative clock error in clock periods, over clock number 0 to L−1;
ClockError2=downsample(ClockError,L_30 GHz). % relative clock error in clock periods, over symbol number 0 to N−1;
Here, N=L/L_30 GHz−1, and is the number of symbols in the channel recording.

In the above example, ClockError is the relative normalized clock period error (normalized to a clock period) between the transmitter 110 and the receiver 120, over the clock index 0 to L, where L is the number of clocks in the channel data recording, ClockError2 is the timing drift of each sounding symbol in clock cycles, i.e., normalized to clock periods, and containing integer and fractional clock periods, ClockTX is the index of transmit sampling clock 107, increasing from 0 to L−1, ClockRX is the receive sampling clock 108 number with clock drift due to frequency error, CFO1 is computed in Hz relative to the sampling clock frequency $F_s$, but may also be computed relative to the carrier frequency, in which case $F_s$ is substituted with $F_c$. L_30 GHz is the number of samples per symbol at 30 GHz Fs.

Using the CFO, the processing unit 140 may perform digital compensation of timing drift for each packet before the coherent averaging, where the timing drift is between the transmit sampling clock 107 and the receive sampling clock 108. Limited coherent averaging, typically up to 10, may be optionally done before performing the digital compensation of timing drift. Compensating for the timing drift achieves equivalent time alignment of each packet to provide corresponding delay compensated packets, and allows large coherent averaging to work. The uncorrected timing drift is indicated by the CFO error. The CFO error is determined and applied, and the timing drift is corrected using the CFO error, when a transmit common local reference frequency of the transmit sampling clock 107 and a receive common local reference frequency of the receive sampling clock 108 are not synchronized, for example, when the transmit and receive common local reference frequencies are not locked together to a common reference frequency or master reference frequency clock, or they do not use corresponding Rubidium clocks as references that are synchronized initially. This post processing based digital calibration achieves 1 PPB residual clock drift, which enables coherent averaging of much more than 100× soundings without observable degradation.

For example, timing drift compensation may be performed for each packet using a frequency-domain phase ramp derived from ClockError2 (discussed above) as follows:

Ftone=Fs_Up/(3*LfundUp); % for 3× soundings per packet
for n=1:Packets %;
   Tau=ClockError2(n)/Fs_Up; % timing drift of nth sounding relative to 1st sounding, in second;
   RotCFO=exp(1i*(−3*LfundUp/2:(3*LfundUp/2−1)).'*Ftone*Tau*2*pi);
   Y=fftshift(fft(yMatOrig1(:,n))).*RotCFO;
   yMatOrig1a(:,n)=ifft(ifftshift(Y));
   Y=fftshift(fft(yMatOrig2(:,n))).*RotCFO;
   yMatOrig2a(:,n)=ifft(ifftshift(Y));
end Here, Packets is the number of packets, which is approximately equal to N, which is the number of symbols in the channel recording. LfundUp is the number of samples per symbol at the sampling clock frequency of Fs_Up that is same as Fs described earlier. The time drift compensation may similarly be performed for the reference data packets, as well as for the sounding data packets. In the for-loop, integer n varies from 1 to Packets to correct the timing drift of each packet, for both Reference as well as Multipath signals. Ftone is the FFT tone spacing for each packet that has 3 symbols. Tau is the timing drift of nth sounding symbol relative to 1st sounding symbol, in seconds. RotCFO is the complex vector that produces the phase ramp correction in the frequency domain; yMatOrig1 is the Reference signal matrix, with each column being one packet; yMatOrig1a is the timing-drift compensated Reference packets; yMatOrig2 is the Multipath channel signal matrix, with each column being one packet; and yMatOrig2a is the timing-drift compensated Multipath channel packets. Y is an intermediate result, and fft, fftshift, ifft are Matlab functions.

In addition, the processing unit 140 may phase de-rotate the delay compensated packets for a residual CFO correction that exists even with zero delay (after delay compensation). The phase de-rotating includes calculating a dot product over time between each sounding symbol and a conjugate of a next consecutive sounding symbol to determine an average phase change per sounding symbol, calculating a stepped phase ramp for the sounding symbols in a time domain to compensate for the average phase change per sounding symbol, and phase de-rotating each sounding symbol in each of the delay compensated packets by the stepped time-domain phase ramp. This particular phase rotation is done in the time domain instead of the frequency domain because it is not a delay correction but is a static residual frequency correction that can potentially remain after the delay correction.

Conventional techniques use triggered soundings, where 3× soundings (3 symbols) are transmitted and 3× soundings are captured at each trigger with large gaps in between. A sliding correlator is used to determine a single CIR. Such triggered soundings create significant clock jitter in the measurements due to imperfections in the trigger circuit in the digitizer instruments, mentioned above, and may not be suitable for coherent averaging and Doppler frequency measurements. Removing the trigger clock jitter requires significant additional signal processing. Further, sending 3× soundings with gaps in between for computing each CIR results in significant loss in SNR considering that only 1× sounding is sufficient and that the gaps cause additional loss in energy as the channel is idle over that time. In comparison, triggered soundings are not needed according to the various embodiments herein because of the gapless consecutive sounding symbols, discussed above.

Figure 7A:
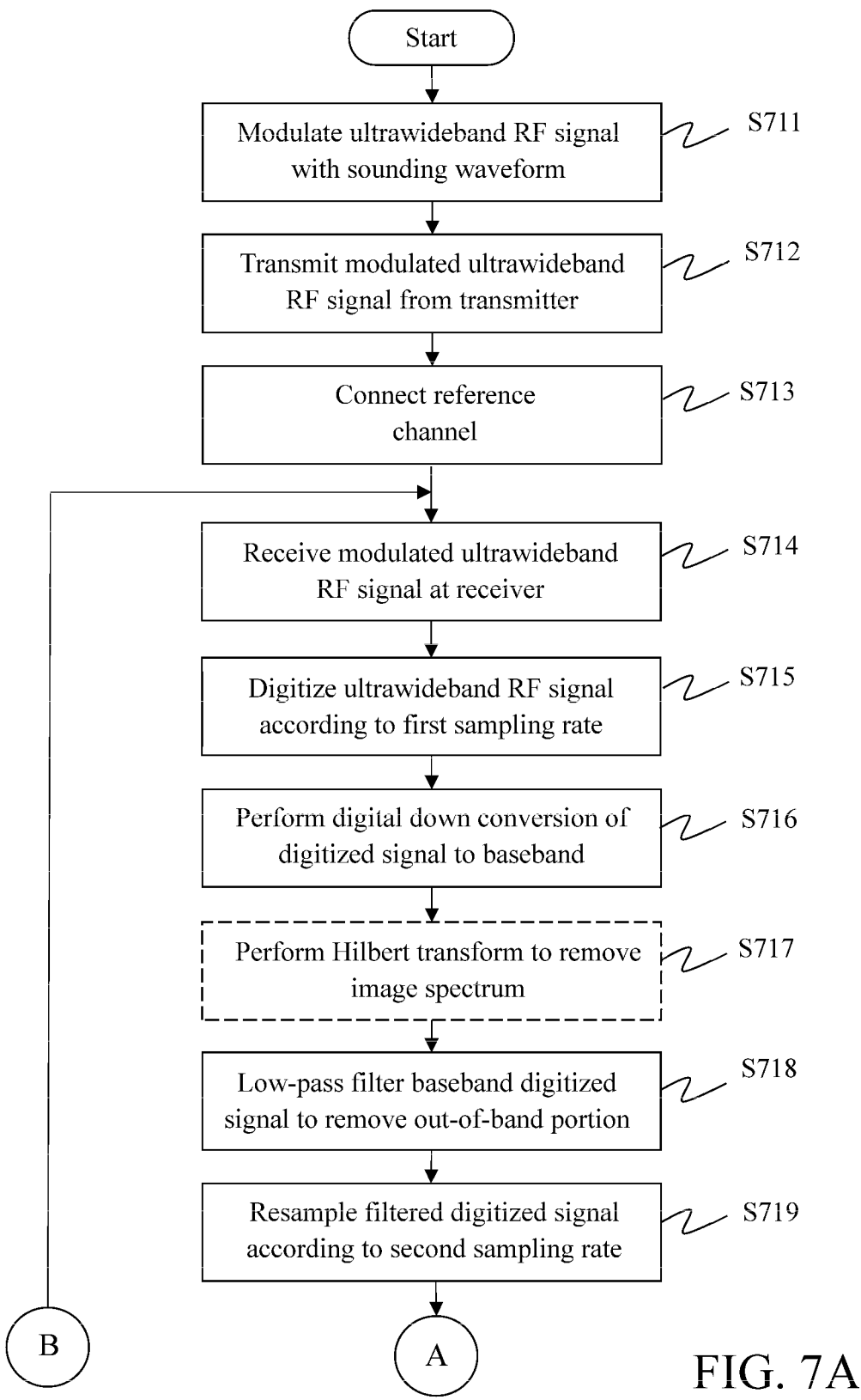
FIG. 7A is a first part of a flow diagram showing a method of performing channel sounding for modeling ultrawideband RF channels, according to a representative embodiment.
Figure 7B:
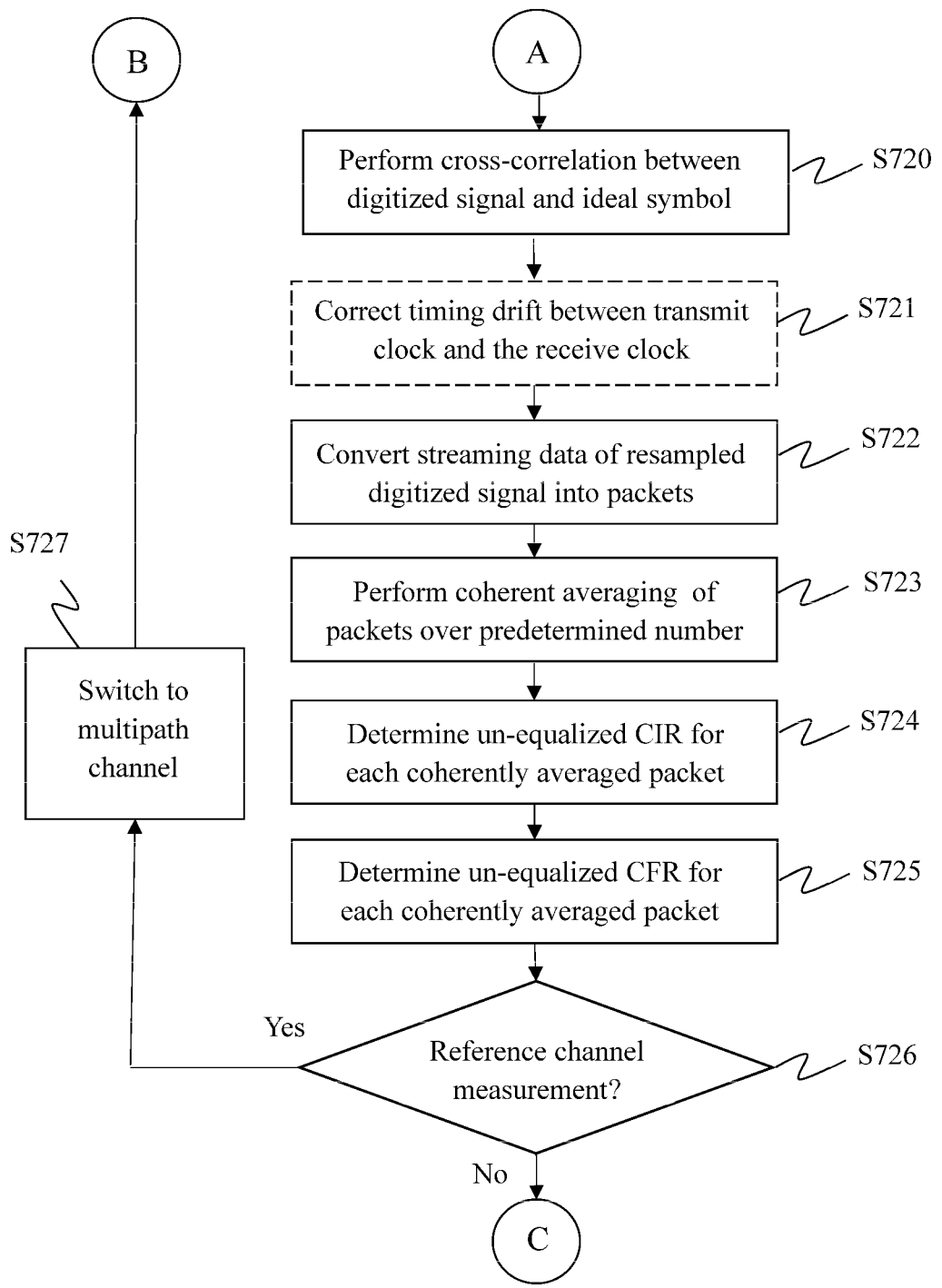
FIG. 7B is a second part of a flow diagram showing the method of performing channel sounding for modeling ultrawideband RF channels, according to a representative embodiment.
Figure 7C:
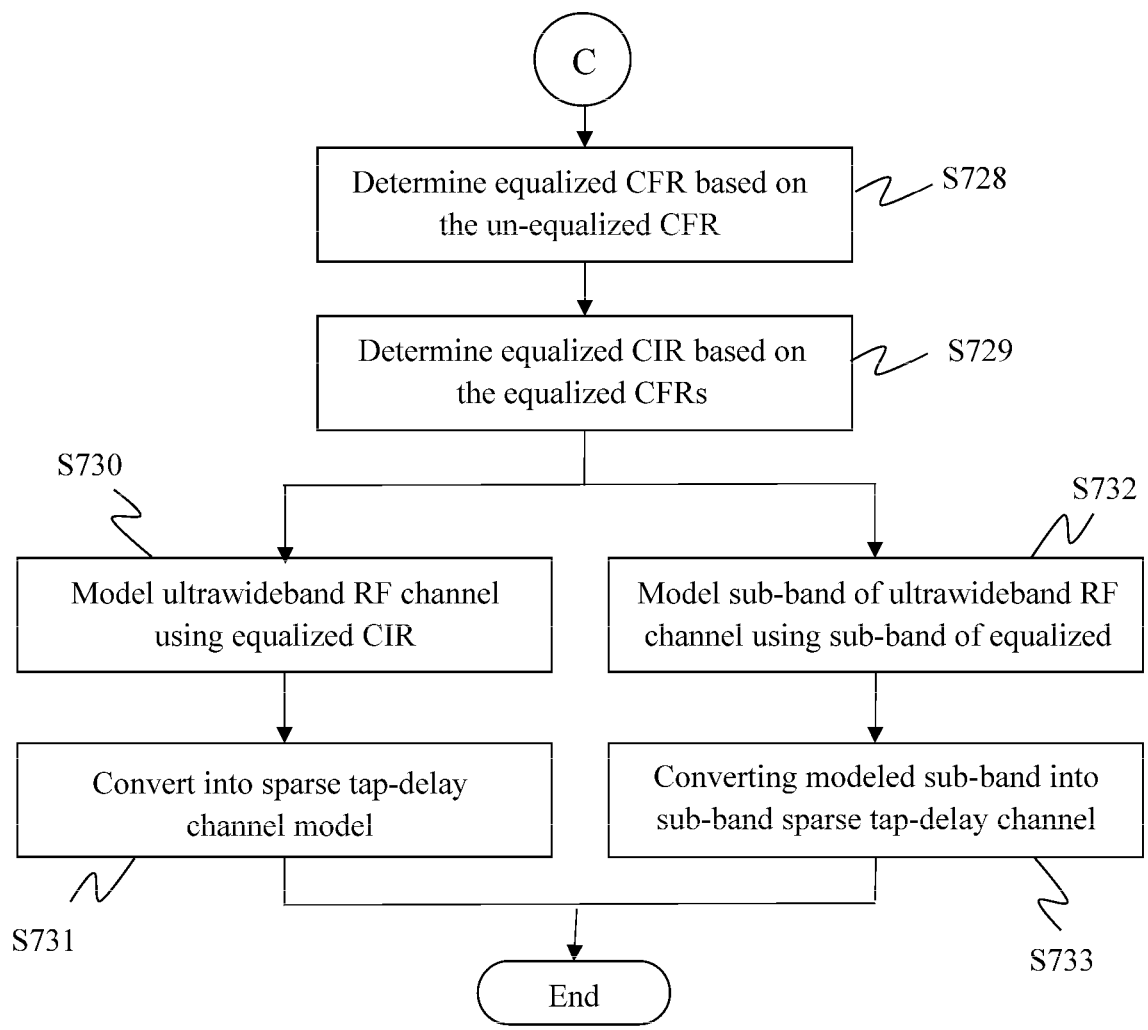
FIG. 7C is a third part of a flow diagram showing the method of performing channel sounding for modeling ultrawideband RF channels, according to a representative embodiment.

FIGS. 7A, 7B and 7C provide a flow diagram showing a method of performing channel sounding for modeling ultrawideband RF channels, according to a representative embodiment. The steps of FIGS. 7A, 7B and 7C may be performed by the communication system 100, including the processing unit 140.

Referring to FIG. 7A, an ultrawideband RF signal is modulated with a sounding waveform at a transmitter of the communication system in block S711. The sounding waveform includes streaming data including multiple conforming sounding symbols. The conforming sounding symbols include no gaps between consecutive conforming sounding symbols and have zero signal phase at the respective boundaries.

In block S712, the ultrawideband RF signal is transmitted from the transmitter according to a transmit sampling clock. The transmit sampling clock of the transmitter and a carrier frequency of the ultrawideband RF signal are derived from a transmit common local reference frequency.

In block S713, a reference channel is selected for initially determining reference measurements in the following process.

In block S714, the ultrawideband RF signal is received at a receiver of the communication system according to a receive sampling clock in the reference channel. The receive sampling clock and a digital local oscillator are derived from a receive common local reference frequency. Performing the channel sounding to model an ultrawideband RF channel requires performing an initial channel sounding for the reference channel, connected in block S713, and then repeating the channel sounding for the required multipath channel, connected in block S727 discussed below, which is typically done over a much longer duration than the reference channel. Accordingly, blocks S714 through S725 are performed twice in order to model one multipath channel, first for the reference channel and second for the multipath channel. The reference channel and the multipath channel are separate channels, although FIG. 1 depicts only the multipath channel for ease of illustration. It is understood, however, that the reference channel has substantially the same configuration as the multipath channel regarding the measurement setup.

In block S715, the ultrawideband RF signal is digitized according to a first sampling rate. The digitization may be performed by an ADC.

In block S716, digital down conversion of the digitized signal to baseband is performed using a digital local oscillator. The baseband digitized signal includes the streaming data.

In block S717, a Hilbert transform of the baseband digitized signal may optionally be performed in order to remove an image spectrum of the baseband digitized signal, as indicated by the dashed box. Performing the Hilbert transform includes transforming the digitized real signal to the frequency domain using an FFT, setting negative frequency terms of the frequency domain signal to zero, and transforming the frequency-domain signal back to a time domain complex signal using an IFFT. Performing the Hilbert transform of the baseband digitized signal removes a negative frequency image.

In block S718, the baseband digitized signal is filtered (e.g., low-pass filtered) to remove an out-of-band portion of the baseband digitized signal. When a Hilbert transform is optionally performed in block S717, the low-pass filtering is relaxed for the Hilbert transformed signal due to the absence of the negative frequency image.

In block S719, the filtered digitized signal is resampled according to a second sampling rate. The second sampling rate, which is a conforming sampling rate, is typically less than the first sampling rate. Typically, the conforming sampling rate has an integer number of samples per chip of the sounding symbol that has N chips.

Continuing to FIG. 7B, in block S720, cross-correlation is performed between the resampled digitized signal beginning segment and an ideal reference symbol to establish a notional start time. The ideal reference symbol is provided by using predetermined algorithm for generating the same. For example, the well know Zadoff-Chu sequences of length N may be used to generate the ideal symbol. Here N can be considered the number of chips in the sequence or symbol.

In block S721, timing drift is optionally corrected between the transmit sampling clock and the receive sampling clock, as indicated by the dashed box. This step is performed only when transmit and receive common local reference frequencies are not locked together and/or when the transmitter and the receiver do not use pre-synchronized Rubidium clocks as references. The timing drift may be corrected by calculating CFO between the transmit sampling clock and the receive sampling clock, and then digitally (numerically) compensating the receive sampling clock to eliminate the calculated CFO, as described above.

In block S722, the streaming data of the resampled digitized signal is converted into multiple packets based on the notional start time of the streaming data., where each packet is formed of at least two consecutive conforming sounding symbols in the streaming data and where the start sample or time of each packet is implicitly known based on the notional start time of the streaming data i.e., without having to cross-correlate each packet with a reference symbol for determining its start time.

In block S723, coherent averaging of the multiple packets is performed over a predetermined number of consecutive packets of the multiple packets to obtain multiple coherently averaged packets. The number of coherent averaged packets in this case may be limited to ten as the coherent averaging is done without or before timing drift correction or clock error compensation. Timing drift correction needs to be performed before coherent averaging if the coherent averaging factor is large.

In block S724, an un-equalized CIR is determined for each coherently averaged packet of the multiple coherently averaged packets. The un-equalized CIR may be determined by performing a time-domain cross-correlation (sliding correlation) between the ideal reference symbol and each of the measured coherently averaged packets.

In block S725, an un-equalized CFR is determined for each coherently averaged packet of the multiple coherently averaged packets. This may be done by performing an FFT of the un-equalized CIR for each coherently averaged packet, discussed above.

In block S726, it is determined whether the channel being measured is a reference channel or a multipath channel. When the channel is a reference channel, the process proceeds to block S727, and switches from the reference channel to the multipath channel to be modeled. The process the returns to block S714, where the ultrawideband RF signal is received at a receiver of the communication system in the multipath channel according to the receive sampling clock. Steps S714 through S725 are the repeated for the multipath channel. When it is determined in block S726 that the channel is not a reference channel (i.e., the channel being measured is the multipath channel), the process proceeds to block S728.

Continuing to FIG. 7C, in block S728, an equalized CFR of the multipath channel is determined based on the un-equalized CFRs for each coherently averaged packet in the reference channel and the multipath channel. For example, the equalized CFR of the multipath channel may be determined using un-equalized CFR measurements for the coherently averaged packet of the reference channel and for the coherently averaged packet of the multipath channel. The ratio of the un-equalized CFR measurements for the coherently averaged packets of the reference and multipath channels produces the equalized CFR.

In block S729, an equalized CIR is determined based on the equalized CFR for each coherently averaged packet. For example, the equalized CIR may be determined by taking the IFFT of the equalized CFR for each coherently averaged packet.

Following block S729, the process follows one or both of two paths for determining sparse tap-delay channel models of the multipath channel. A first path includes blocks S730 and S731. In block S730, an ultrawideband RF channel of the communication system is modeled using the equalized CIR. In block S731, the modeled ultrawideband RF channel is converted into a sparse tap-delay channel model for each coherently averaged packet. Sparse means that the number of tap-delay samples are much fewer than the samples in a corresponding CIR. The CIR can be reconstructed from the sparse tap-delay model using an interpolation waveform that was used in the creation of the sparse tap-delay model. Typically, the interpolation waveform is the IFFT of the frequency-domain window function that is used for selecting the required CFR e.g., a sub-band or full-band of the original CFR. A second path includes blocks S732 and S733. In block S732, a sub-band of the ultrawideband RF channel of the communication system is modeled using a windowed sub-band of the equalized CFR. In block S733, the modeled sub-band is converted into a sub-band sparse tap-delay channel model for each coherently averaged packet. One or both of the sparse tap-delay channel model and the sub-band sparse tap-delay channel model for each coherently averaged packet may be used to reduce the storage size of the channel measurement, saving valuable computer and memory resources. In addition, the sparse tap-delay channel model and/or the sub-band sparse tap-delay channel model may be used in efficient play back of a channel in either simulation or real-time hardware channel emulation, e.g., in a PROPSIM channel emulator.

FIG. 8 is a simplified block diagram of a representative processor unit, such as the processing unit 140 in FIG. 1, according to a representative embodiment.

Referring to FIG. 8, processing unit 140 includes a processor 810, memory 820 for storing instructions executable by the processor 810 to implement the processes described herein, as well as a display 830 and an interface 840 to enable user interaction. The processor 810 may also access a database 850 that stores information to be used for testing, for example.

The processor 810 is representative of one or more processing devices, and is configured to execute software instructions to perform functions as described in the various embodiments herein. The processor 810 may be implemented by a general purpose computer, a central processing unit, one or more processors, microprocessors or microcontrollers, a state machine, a programmable logic device, FPGAs, application specific integrated circuits (ASICs), or combinations thereof, using any combination of hardware, software, firmware, hard-wired logic circuits, or combinations thereof. The term "processor" encompasses an electronic component able to execute a program or machine executable instructions. References to a processor should be interpreted to include more than one processor or processing core, as in a multi-core processor, and/or parallel processors. Programs have software instructions performed by one or multiple processors that may be within the same computing device or which may be distributed across multiple computing devices.

The memory 820 may include a main memory and/or a static memory, where such memories may communicate with each other and the processor 810 via one or more buses. The memory 820 stores instructions used to implement some or all aspects of methods and processes described herein, including the methods described above with reference to FIGS. 7A to 7C, for example. The memory 820 may be implemented by any number, type and combination of random access memory (RAM) and read-only memory (ROM), for example, and may store various types of information, such as software algorithms, data based models including neural network based models, and computer programs, all of which are executable by the processor 810. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of storage medium known in the art.

The memory 820 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term non-transitory specifically disavows fleeting characteristics such as characteristics of a carrier wave or signal or other forms that exist only transitorily in any place at any time. The memory 820 may store software instructions and/or computer readable code that enable performance of various functions. The memory 820 may be secure and/or encrypted, or unsecure and/or unencrypted.

Similarly, the database 850 may be implemented by any number, type and combination of RAM and ROM, for example, discussed above, The database 850 likewise is a tangible storage medium for storing data and executable software instructions, and is non-transitory during the time software instructions are stored therein. The database 850 may be secure and/or encrypted, or unsecure and/or unencrypted.

"Memory" is an example of computer-readable storage media, and should be interpreted as possibly being multiple memories or databases. The memory or database may for instance be multiple memories or databases local to the computer, and/or distributed amongst multiple computer systems or computing devices. A computer readable storage medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

The display 830 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 830 may also provide a graphical user interface (GUI) for displaying and receiving information to and from the user.

The interface 840 may include a user and/or network interface for providing information and data output by the processor 810 and/or the memory 820 to the user and/or for receiving information and data input by the user. That is, the interface 840 enables the user to enter data and to control or manipulate aspects of the processes described herein, and also enables the processor 810 to indicate the effects of the user's control or manipulation. The interface 840 may connect one or more user interfaces, such as a mouse, a keyboard, a mouse, a trackball, a joystick, a haptic device, a microphone, a video camera, a touchpad, a touchscreen, voice or gesture recognition captured by a microphone or video camera, for example, or any other peripheral or control to permit user feedback from and interaction with the processor 810. The interface 840 may further include one or more of ports, disk drives, wireless antennas, or other types of receiver circuitry.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of performing channel sounding for modeling ultrawideband radio frequency (RF) channels, the method comprising:
   modulating an ultrawideband RF signal with a sounding waveform at a transmitter of a communication system, wherein the sounding waveform comprises streaming data including a plurality of conforming sounding symbols, wherein the plurality of conforming sounding symbols include no gaps between consecutive conforming sounding symbols;
   transmitting the ultrawideband RF signal from the transmitter according to a transmit sampling clock, wherein the transmit sampling clock and a carrier frequency of the ultrawideband RF signal are derived from a transmit common local reference frequency;
   receiving the ultrawideband RF signal at a receiver of the communication system according to a receive sampling clock, wherein the receive sampling clock and a digital local oscillator are derived from a receive common local reference frequency;
   digitizing the ultrawideband RF signal according to a first sampling rate;
   performing digital down conversion of the digitized signal to a baseband digital signal using the digital local oscillator, wherein the baseband digitized signal comprises the streaming data;

filtering the baseband digitized signal to remove an out-of-band portion of the baseband digitized signal;

resampling the filtered digitized signal according to a second sampling rate, wherein the second sampling rate is a conforming sampling rate;

performing cross-correlation between the resampled digitized signal beginning segment and an ideal reference symbol to establish a notional start time;

converting the streaming data of the resampled digitized signal into a plurality of packets based on the notional start time of the streaming data, wherein each packet is formed of at least two consecutive conforming sounding symbols in the streaming data and wherein a start sample or time of each packet is implicitly known based on the notional start time of the streaming data;

performing coherent averaging of the plurality of packets over a predetermined number of consecutive packets of the plurality of packets to obtain a plurality of coherently averaged packets;

determining an un-equalized channel impulse response (CIR) for each coherently averaged packet of the plurality of coherently averaged packets by performing a time-domain cross-correlation between the ideal reference symbol and the plurality of coherently averaged packets;

determining an un-equalized channel frequency response (CFR) for each coherently averaged packet of the plurality of coherently averaged packets by performing a fast Fourier transform (FFT) of said un-equalized CIR for each coherently averaged packet;

determining an equalized CFR based on the un-equalized CFR for each coherently averaged packet;

determining an equalized CIR based on the equalized CFR for each coherently averaged packet; and performing one or more of:

modeling the ultrawideband RF channel using the equalized CIR, and converting the modeled ultrawideband RF channel into a sparse tap-delay channel model for each coherently averaged packet; and modeling a sub-band of the ultrawideband RF channel using a windowed sub-band of the equalized CFR, and converting the modeled sub-band into a sub-band sparse tap-delay channel model for each coherently averaged packet.

2. The method of claim 1, further comprising:

computing clock frequency offset (CFO) between the transmit sampling clock and the receive sampling clock when transmit and receive common local reference frequencies are not locked together or do not use Rubidium clocks as references; and performing digital compensation of timing drift for each packet of the plurality of packets, caused by timing drift between the transmit sampling clock and the receive sampling clock, to achieve equivalent time alignment of each packet to provide a plurality of delay compensated packets, wherein the timing drift is indicated by the CFO.

3. The method of claim 2, further comprising phase de-rotating the plurality of delay compensated packets based on computation of a residual CFO, wherein phase de-rotating the plurality of delay compensated packets comprises:

calculating a dot product over time between each sounding symbol and a conjugate of a next consecutive sounding symbol of the plurality of sounding symbols to determine an average phase change per sounding symbol of the plurality of sounding symbols;

calculating a stepped phase ramp for the plurality of sounding symbols in a time domain to compensate for the average phase change per sounding symbol; and phase de-rotating each sounding symbol in each of the plurality of delay compensated packets by the stepped phase ramp, wherein the residual CFO is the average phase change per symbol divided by symbol duration.

4. The method of claim 1, further comprising taking a Hilbert transform of the baseband digitized signal to remove an image spectrum of the signal, wherein the filtering is relaxed for the Hilbert transformed digitize signal due to absence of the image spectrum, and wherein taking the Hilbert transform comprises:

transforming the baseband digitized signal to a frequency-domain signal using an FFT;

setting negative frequency terms of the frequency domain to signal zero; and transforming the frequency-domain signal back to a time domain complex signal using an inverse FFT (IFFT) to provide the Hilbert transformed digitized signal, excluding a negative frequency image.

5. The method of claim 1, wherein determining the equalized CFR includes applying a Weiner Filter to minimize effects of noise and distortion, wherein the Weiner Filter is implemented using $S_{xy}/S_{xx}$ in a frequency domain or implemented using a Yule-Walker technique or a Least Squares method in a time-domain, wherein $S_{xy}$ is cross-spectral density of the packets and a reference signal and $S_{xx}$ is spectral density of the reference signal.

6. The method of claim 1, wherein determining the equalized CFR comprises calculating $H(f)=Y(f)/X(f)$, wherein $Y(f)$ is an FFT of a channel signal un-equalized CIR and $X(f)$ is an FFT of a reference signal, wherein the reference signal comes from an initial measurement of a reference channel.

7. The method of claim 1, wherein determining the equalized CIR comprises performing an IFFT of the equalized CFR for each coherently averaged packet.

8. The method of claim 1, wherein the conforming sounding symbols include:

autocorrelation=0 for $Tc \leq |\tau| < T_{sym}$, and autocorrelation=1 for $\tau=0$, where $\tau$ is correlation delay, $T_c$ is chip period with the conforming sounding symbol comprising N chips, and $T_{sym}$ is symbol period, wherein the conforming sounding symbols include:

a zero signal phase at boundaries of the conforming sounding symbols, wherein $2\pi*F_c*T_{sym}$=integer multiples of $2\pi$, where $F_c$ is the carrier frequency of the ultrawideband RF signal and $T_{sym}$ is symbol period equal to $N*T_c$.

9. The method of claim 1, further comprising:

extracting a Doppler spectrum from the plurality of coherently averaged packets by performing an FFT the equalized CIR, or by performing an FFT of the equalized CFR for each coherently averaged packet over time, wherein the Doppler spectrum comprises at least one of Doppler frequency over delay, which is a function of a Doppler frequency index and a delay index, or Doppler over channel frequency, which is a function of the Doppler frequency index and a channel frequency index.

10. A system for performing channel sounding for modeling ultrawideband radio frequency (RF) channels, the system comprising:

(i) a transmitter comprising a signal generator configured to generate an ultrawideband RF signal and to modulate the ultrawideband RF signal with a sounding waveform, wherein the sounding waveform comprises streaming data including a plurality of conforming sounding symbols, wherein the plurality of conforming sounding symbols include no gaps between consecutive conforming sounding symbols, wherein the transmitter is configured to transmit the ultrawideband RF signal according to a transmit sampling clock, wherein the transmit sampling clock and a carrier frequency of the ultrawideband RF signal are derived from a transmit common local reference frequency;

(ii) a receiver configured to receive the ultrawideband RF signal according to a receive sampling clock, wherein the receiver comprises:

an analog to digital converter (ADC) configured to digitize the ultrawideband RF signal according to a first sampling rate to provide a digitized signal;

a digital local oscillator configured to perform digital down conversion of the digitized signal to a baseband digitized signal comprising the streaming data, wherein the receive sampling clock and the digital local oscillator are derived from a receive common local reference frequency; and (iii) a processing unit configured to:

filter the baseband digitized signal to remove an out-of-band portion of the baseband digitized signal;

resample the filtered digitized signal according to a second sampling rate, wherein the second sampling rate is a conforming sampling rate;

perform cross-correlation between the resampled digitized signal beginning segment and an ideal reference symbol to establish a notional start time;

convert the streaming data of the resampled digitized signal into a plurality of packets based on the notional start time of the streaming data, wherein each packet is formed of at least two consecutive conforming sounding symbols in the streaming data and wherein a start sample or time of each packet is implicitly known based on the notional start time of the streaming data;

perform coherent averaging of the plurality of packets over a predetermined number of consecutive packets of the plurality of packets to obtain a plurality of coherently averaged packets;

determine an un-equalized channel impulse response (CIR) for each coherently averaged packet of the plurality of coherently averaged packets by performing cross-correlation in a time-domain between the ideal reference symbol and the plurality of coherently averaged packets;

determine an un-equalized channel frequency response (CFR) for each coherently averaged packet of the plurality of coherently averaged packets by performing a fast Fourier transform (FFT) of the un-equalized CIR for each coherently averaged packet;

determine an equalized CFR based on the un-equalized CFR for each coherently averaged packet;

determine an equalized CIR based on the equalized CFR for each coherently averaged packet; and perform at least one of:

model the ultrawideband RF channel using the equalized CIR, and convert the modeled ultrawideband RF channel into a sparse tap-delay channel model for each coherently averaged packet; or model a sub-band of the ultrawideband RF channel using a windowed sub-band of the equalized CFR, and convert the modeled sub-band into a sub-band sparse tap-delay channel model for each coherently averaged packet.

11. The system of claim 10, wherein the processing unit is further configured to:

compute clock frequency offset (CFO) between the transmit sampling clock and the receive sampling clock when transmit and receive common local reference frequencies are not locked together or do not use Rubidium clocks as references; and perform digital compensation of timing drift for each packet of the plurality of packets, caused by timing drift between the transmit sampling clock and the receive sampling clock, to achieve equivalent time alignment of each packet to provide a plurality of delay compensated packets, wherein the timing drift is indicated by the CFO.

12. The system of claim 11, wherein the processing unit is further configured to:

phase de-rotate the plurality of delay compensated packets based on estimation of a residual CFO, wherein phase de-rotating the plurality of delay compensated packets comprises:

calculating a dot product over time between each conforming sounding symbol and a conjugate of a next consecutive conforming sounding symbol of the plurality of conforming sounding symbols to determine an average phase change per conforming sounding symbol of the plurality of conforming sounding symbols;

calculating a stepped phase ramp for the plurality of conforming sounding symbols in a time domain to compensate for the average phase change per conforming sounding symbol; and phase de-rotating each conforming sounding symbol in each of the plurality of delay compensated packets by the stepped phase ramp, wherein the residual CFO is the average phase change per symbol divided by symbol duration.

13. The system of claim 10, wherein the plurality of conforming sounding symbols comprise a Zadoff-Chu sequence.

14. The system of claim 10, wherein the processing unit is further configured to:

take a Hilbert transform of the baseband digitized signal to remove an image spectrum of the signal, and wherein taking the Hilbert transform comprises:

transforming the baseband digitized signal to a frequency-domain signal using an FFT;

setting negative frequency terms of the frequency domain to signal zero; and transforming the frequency-domain signal back to a time domain complex signal using an inverse FFT (IFFT) to provide the Hilbert transformed digitized signal, excluding a negative frequency image.

15. The system of claim 10, wherein each coherently averaged packet comprises two or three symbols, and wherein the un-equalized CIR corresponds to a sliding cross-correlation of the ideal reference symbol over a middle symbol in each coherently averaged packet.

16. The system of claim 10, wherein the processing unit is configured to determine the equalized CFR by applying a Weiner Filter to minimize effects of noise and distortion, wherein the Weiner Filter is implemented using $S_{xy}/S_{xx}$ in a frequency domain or implemented using a Yule-Walker technique or a Least Squares method in the time-domain, wherein $S_{xy}$ is cross-spectral density of the plurality of packets and a reference signal and $S_{xx}$ is spectral density of the reference signal.

17. The system of claim 16, wherein the processing unit is further configured to:

measure the reference signal; and determine a CFR for the measured reference signal by performing an FFT of a cross-correlation between the ideal reference symbol and the measured reference signal, wherein measuring the reference signal comprises removing a channel between the transmitter and the receiver by connecting respective RF ports of the transmitter and the receiver directly or by positioning respective antennas of the transmitter and the receiver in close proximity in an anechoic chamber.

18. The system of claim 10, wherein the processing unit is configured to determine the equalized CIR by performing an IFFT of the equalized CFR for each coherently averaged packet.

19. The system of claim 10, wherein at the transmitter, the transmit common local reference frequency is used for a waveform sampling clock for a digital to analog converter (DAC) and for an RF carrier frequency generation synthesizer or digital up-conversion DAC; and wherein at the receiver, the receive common local reference frequency is used for generating a local oscillator (LO) synthesizer for down conversion from the carrier frequency of the ultrawideband RF signal to an intermediate frequency (IF) of an IF signal, and for generating a sampling clock of the ADC that is used for sampling the ultrawideband RF signal or the IF signal.

20. The system of claim 10, wherein:

the transmitter further comprises a first programmable attenuator configured to perform first automatic gain control (AGC) on the ultrawideband RF signal to obtain a desired signal level for transmitting the ultrawideband RF signal; and the receiver further comprises a plurality of programmable attenuators configured to perform additional AGC of the ultrawideband RF signal to manage path loss of the received ultrawideband RF signal.

* * * * *